United States Patent
Swanson et al.

(10) Patent No.: US 9,476,266 B2
(45) Date of Patent: Oct. 25, 2016

(54) HYDRAULIC CABLE-SKATE DRIVE SYSTEM FOR CATWALK

(71) Applicant: Forum US, Inc., Houston, TX (US)

(72) Inventors: Gregory David Swanson, Magnolia, TX (US); Joe Rodney Berry, Cypress, TX (US)

(73) Assignee: Forum US, Inc., Houston, TX (US)

( * ) Notice: Subject to any disclaimer, the term of this patent is extended or adjusted under 35 U.S.C. 154(b) by 6 days.

(21) Appl. No.: 14/207,138

(22) Filed: Mar. 12, 2014

(65) Prior Publication Data

US 2014/0286732 A1   Sep. 25, 2014

Related U.S. Application Data

(60) Provisional application No. 61/782,040, filed on Mar. 14, 2013.

(51) Int. Cl.
| | | |
|---|---|---|
| *F15B 15/00* | (2006.01) | |
| *F15B 15/02* | (2006.01) | |
| *F16H 19/00* | (2006.01) | |
| *E21B 19/15* | (2006.01) | |
| *F16H 19/06* | (2006.01) | |
| *B66D 3/00* | (2006.01) | |
| *B29C 45/42* | (2006.01) | |
| *B60P 3/07* | (2006.01) | |
| *B29C 37/00* | (2006.01) | |

(52) U.S. Cl.
CPC ............ *E21B 19/15* (2013.01); *B29C 37/0007* (2013.01); *B29C 45/42* (2013.01); *B60P 3/07* (2013.01); *B66D 3/006* (2013.01); *F15B 15/02* (2013.01); *F16H 19/06* (2013.01); *F16H 2019/0686* (2013.01)

(58) Field of Classification Search
CPC ............ B66D 3/00; B66D 3/04; B66D 3/08; E21B 19/00; E21B 19/14; E21B 19/15; E21B 19/20; F15B 15/02; F15B 15/1471; F16H 19/06; F16H 2019/0686
USPC ................. 104/173.1, 176, 196; 198/750.11, 198/750.5, 750.7; 254/280, 281, 286, 291, 254/386; 414/22.51–22.59, 22.61–22.67; 74/110, 89.22; 92/137
See application file for complete search history.

(56) References Cited

U.S. PATENT DOCUMENTS

| | | | | |
|---|---|---|---|---|
| 2,615,585 | A * | 10/1952 | Menhall | 414/22.57 |
| 3,273,861 | A * | 9/1966 | Schuff | 74/110 |
| 3,949,620 | A * | 4/1976 | Zehnder | 74/110 |
| 4,053,063 | A | 10/1977 | Harper, Jr. | |
| 4,067,453 | A * | 1/1978 | Moller | 414/22.61 |
| 4,456,121 | A * | 6/1984 | Palmer et al. | 198/750.7 |
| 4,470,740 | A * | 9/1984 | Frias | 414/22.61 |
| 4,494,899 | A * | 1/1985 | Hoang et al. | 414/22.61 |
| 4,656,881 | A * | 4/1987 | Goedecke et al. | 74/110 |
| 4,715,761 | A | 12/1987 | Berry et al. | |
| 4,770,598 | A * | 9/1988 | Kotani | 414/752.1 |

(Continued)

OTHER PUBLICATIONS

PCT International Search Report and Written Opinion for Application PCT/US2014/025962, dated Jul. 18, 2014.

*Primary Examiner* — Gregory Adams
(74) *Attorney, Agent, or Firm* — Patterson & Sheridan, L.L.P.

(57) ABSTRACT

A drive system for a catwalk skate that uses a hydraulic skate-cable drive system. The system includes two counter-acting hydraulic cylinders, each with a sheave connected to the cylinder rods, and a cable that winds around each of the sheaves and connects to both ends of the skate.

17 Claims, 13 Drawing Sheets

(56) References Cited

U.S. PATENT DOCUMENTS

| | | |
|---|---|---|
| 6,272,972 B1 * | 8/2001 | Kim .............................. 92/137 |
| 6,408,956 B1 | 6/2002 | Morris et al. |
| 6,969,223 B2 * | 11/2005 | Tolmon et al. ............ 414/22.54 |
| 8,215,888 B2 * | 7/2012 | Tetley et al. ............... 414/22.62 |
| 2008/0131247 A1 * | 6/2008 | Nespor ......................... 414/494 |
| 2010/0163247 A1 | 7/2010 | Wright et al. |

* cited by examiner

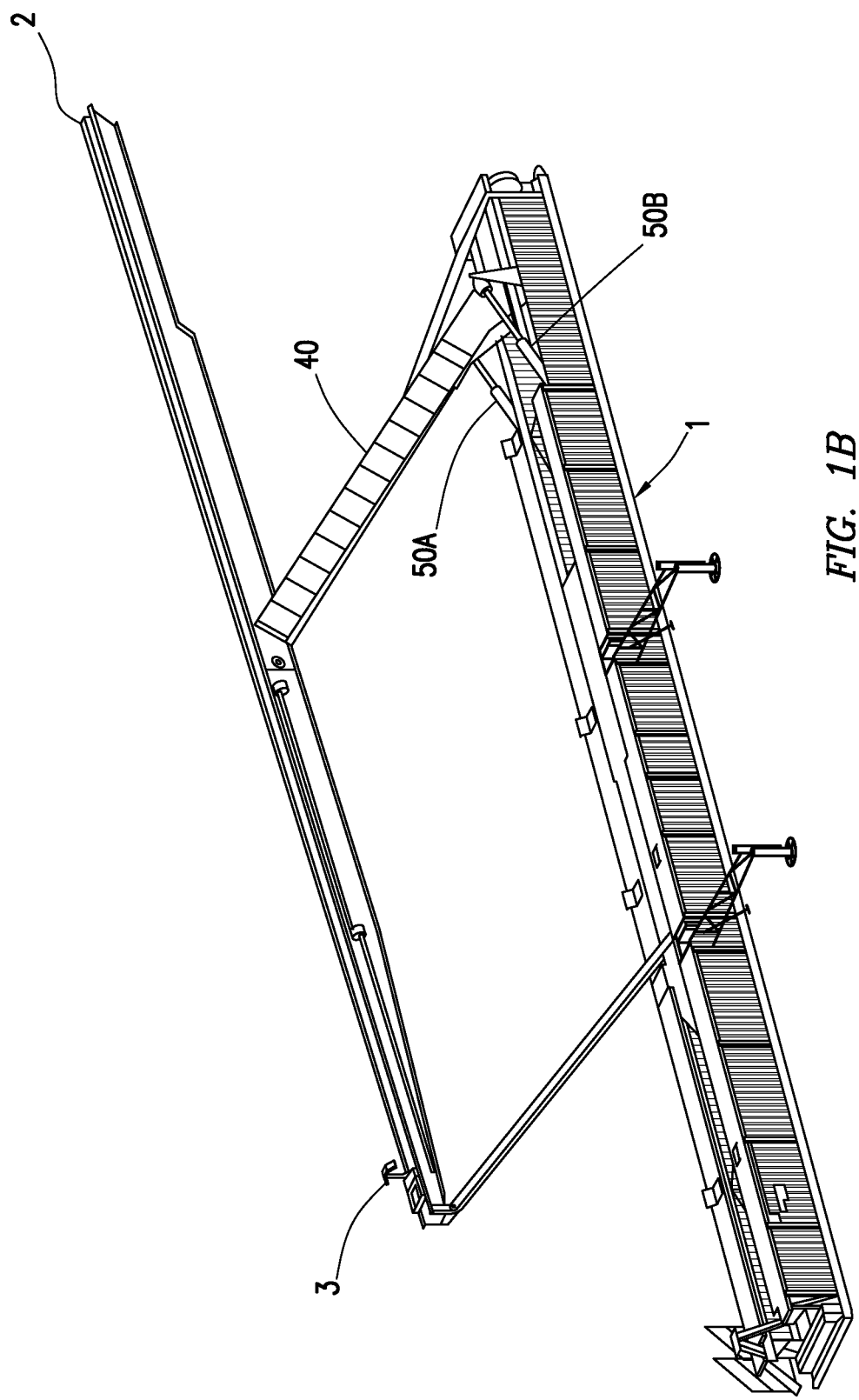

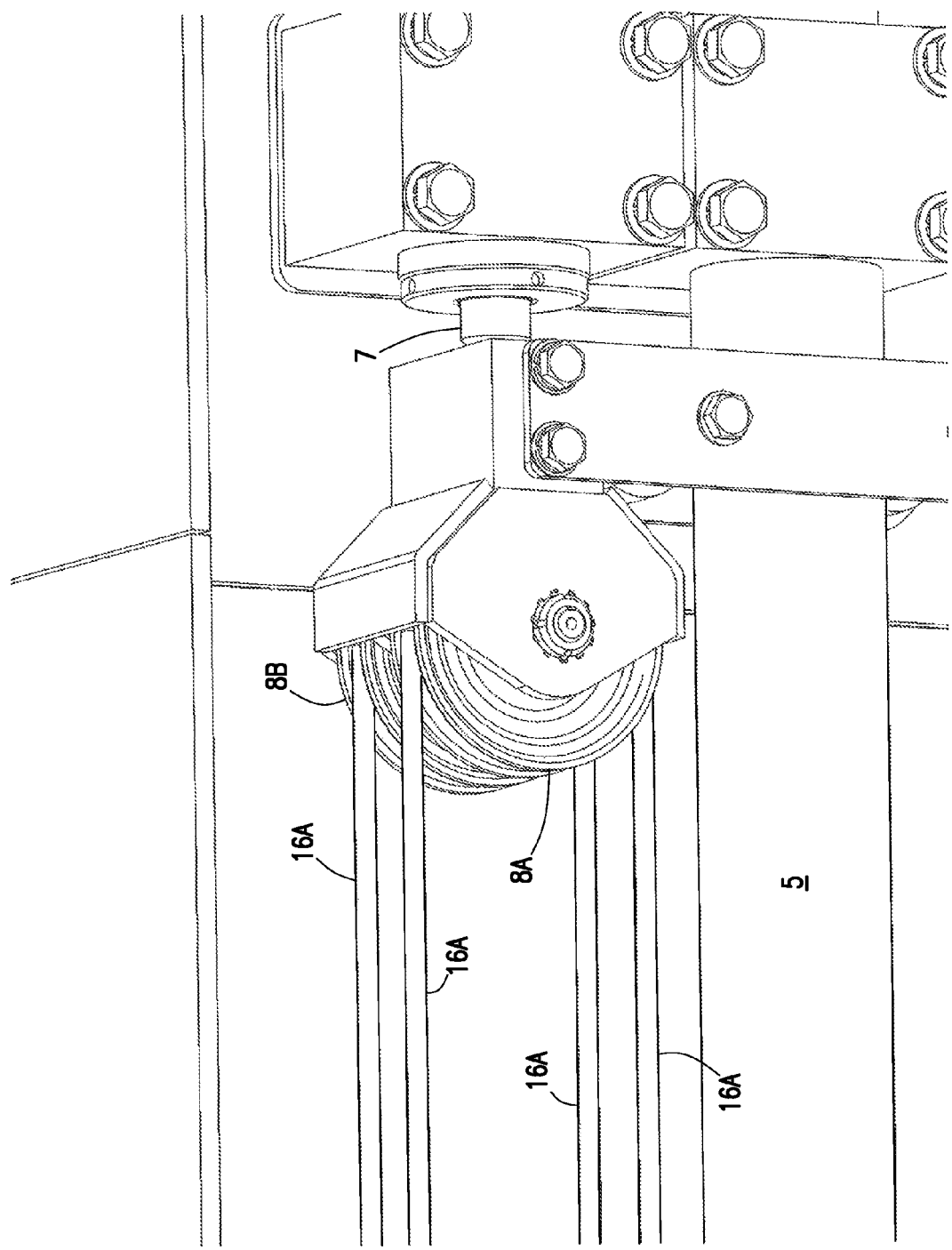

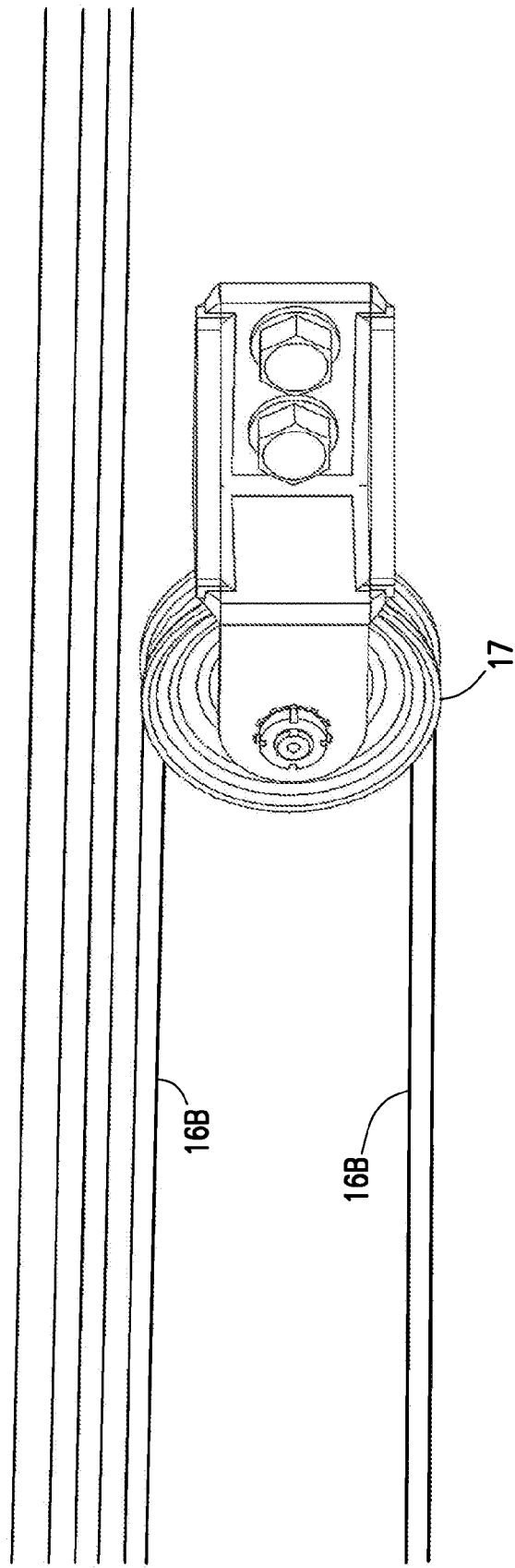

US 9,476,266 B2

HYDRAULIC CABLE-SKATE DRIVE SYSTEM FOR CATWALK

CROSS REFERENCE TO RELATED APPLICATIONS

This application claims benefit of U.S. Provisional Patent Application No. 61/782,040, filed Mar. 14, 2013, the contents of which are herein incorporated by reference in their entirety.

BACKGROUND OF THE INVENTION

1. Field of the Invention

Embodiments of the invention generally relate to catwalks for conveying pipe to a drill floor from a lower section of a drilling rig or drill site. Specifically, embodiments of the invention relate to a hydraulic skate-cable drive system that is used instead of the chain and motor drive or winch system that are used by prior art catwalks.

2. Description of the Related Art

In a drilling operation or rig work-over operation, whether on a water-based or land-based drilling rig, pipe for the drilling operation, casing, or other tubulars are often stored at or supplied from a level that is lower than the drill floor. Operators typically use a "catwalk" to convey the pipe from the lower level to the drill floor. The pipe is typically mechanically transported (e.g. pushed with a skate and/or pulled in a v-shaped trough) from a level below the rig floor to the rig floor.

Prior art catwalks use a skate that is pulled from the lower end of the catwalk by a chain on a loop that is powered by a motor, or by a cable that is pulled toward the top of the catwalk trough using a winch. Such systems also require the use of a brake to stop the skate at a position where the skate causes the opposite end of the pipe or other tubular to be positioned near the drill floor where the rig workers can attach the end of the pipe to another hoist and move the pipe to the rotary or a setback area on the drill floor. The use of a motor and chain or a cable and winch along with a brake can lead to many mechanical breakdowns and to several potentially dangerous situations. If the chain breaks, the pipe and skate could move uncontrollably toward the bottom of the catwalk. If the brake fails, the pipe could be moved too far into the drill center, putting the drill floor workers at risk.

Accordingly, it would be useful to have a skate drive system that would prevent the skate and pipe from falling toward the bottom of the catwalk in the event of a system failure. It would also be useful to have a system that does not require the use of a brake to prevent the skate from moving too far up the trough so that the pipe does not put the rig workers at risk.

SUMMARY OF THE INVENTION

Embodiments of the invention provide a drive system for a catwalk skate that uses a hydraulic skate-cable drive system. The system has two counteracting hydraulic cylinders, each with a sheave connected to the rod. A cable winds around each of the sheaves as well as a number of other sheaves and is connected to both ends of the skate that move the pipe in the trough. The cable and the skate are moved by retraction of the rod of one cylinder which causes the second cylinder to extend as the second cylinder is connected to the one cylinder through the cable and the skate. As the counteracting cylinders are physically connected only through the cable and skate, it is possible to automatically tension the cable during operation.

BRIEF DESCRIPTION OF THE DRAWINGS

So that the manner in which the above recited aspects of the invention can be understood in detail, a more particular description of embodiments of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1B shows an embodiment of the invention in the position in which the trough is in the process of being raised to the drill floor level.

FIG. 5A is a detailed view of the sheave, the rod for the upper hydraulic cylinder and the lower hydraulic cylinder shown in FIG. 3C.

FIG. 7 is a detailed view of the sheave and bracket at the drill floor end of the trough.

DETAILED DESCRIPTION

Figure 1A:
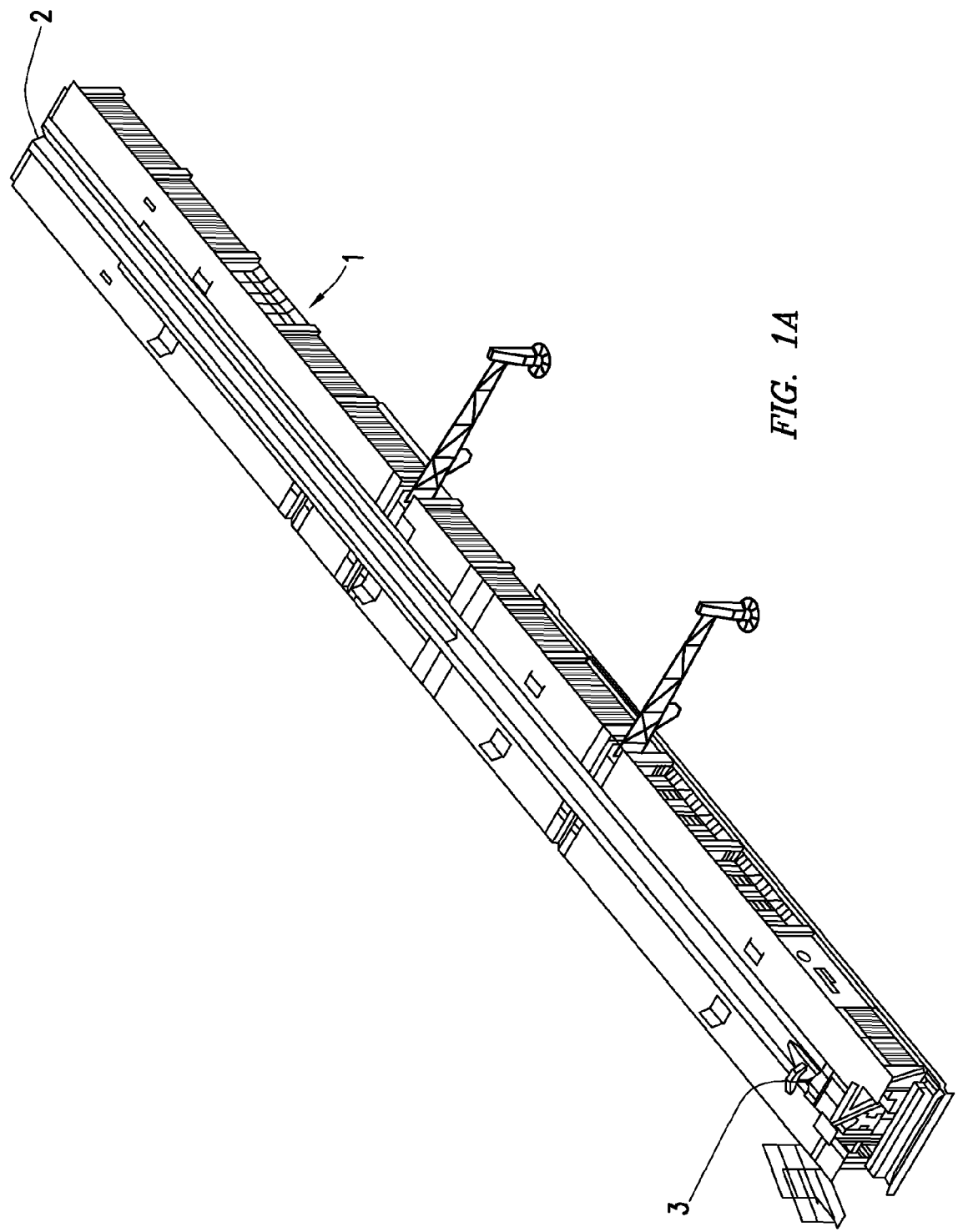
FIG. 1A shows an embodiment of the invention in the position in which pipe is loaded onto the catwalk and into the trough or unloaded from the trough.

FIG. 1A shows trough 2 in its lowered position in catwalk 1. One or more sections of pipe are loaded into trough 2 for transfer to a higher level drill floor. Skate 3 may move and advance pipe toward the drill floor.

FIG. 1B shows trough 2 in the process of being raised toward a drill floor. A leg 40 of the catwalk 1 is raised by hydraulic cylinders 50A and 50B to raise trough 2. Skate 3 would be moving pipe along trough 2 toward the drill floor.

Figure 1C:
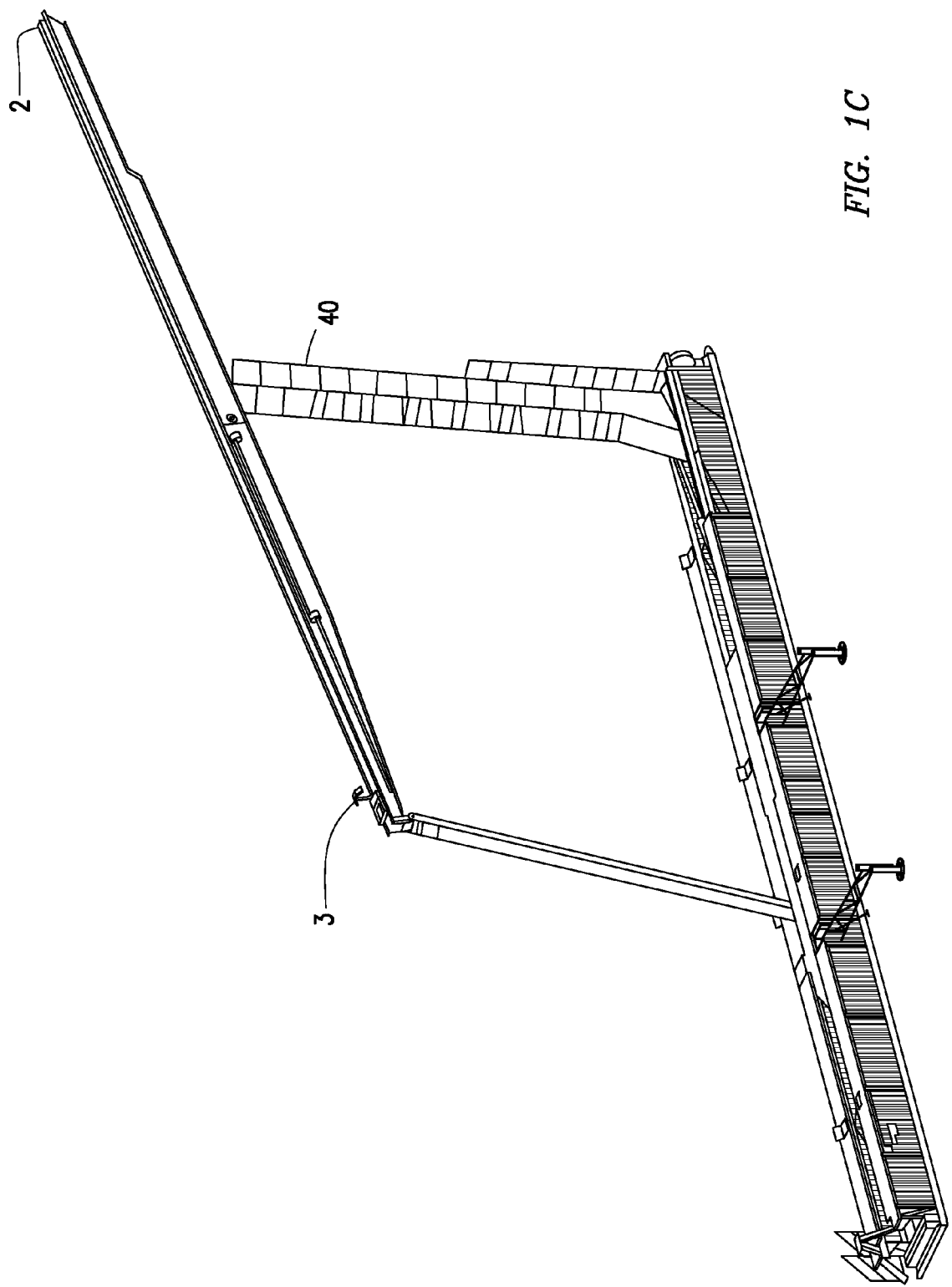
FIG. 1C shows the trough in an elevated position in which pipe is being conveyed to or from the drill floor.

FIG. 1C shows trough 2 fully raised where the upper end of trough 2 would be adjacent to a drill floor. Skate 3 advances pipe to the drill floor end of trough 2 so that the pipe can be removed from the trough by the crew on the drill floor and moved toward the rotary or into a setback area on the drill floor. Generally, catwalks use a skate that is pulled from the lower end of the catwalk by a chain on a loop that is powered by a motor or by a cable that is pulled toward the top of the catwalk trough using a winch.

Figure 2:
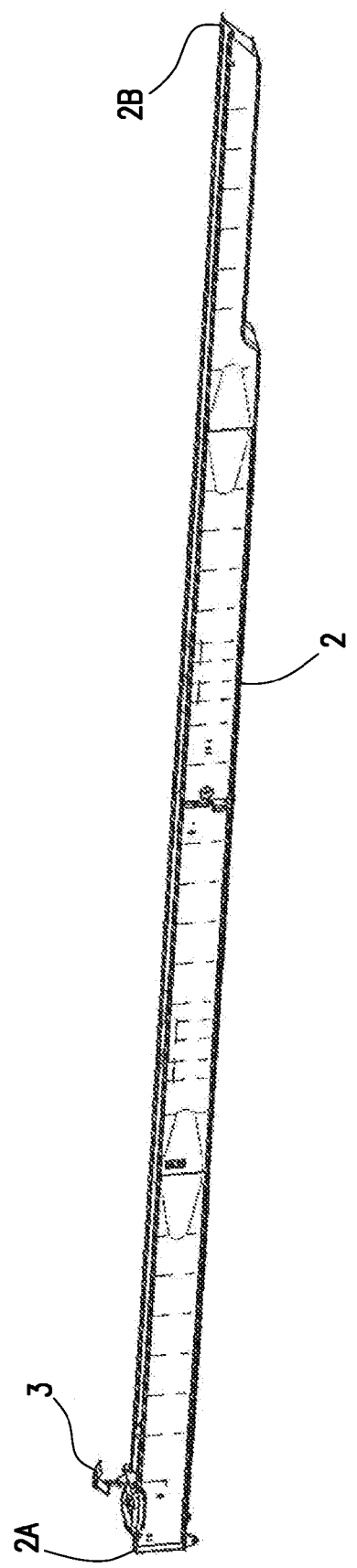
FIG. 2 shows the trough and the skate for advancing tubulars to a drill floor.

FIG. 2 shows a side view of the trough 2 and the skate 3. The trough 2 may include one or more sections coupled together. The skate 3 begins at trough end 2A and advances pipe toward trough end 2B, which is adjacent to a drill floor when the trough 2 is fully raised.

Figure 3C:
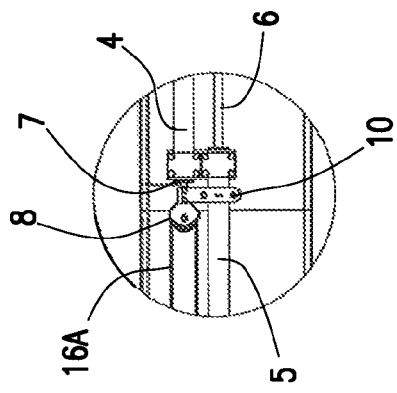
FIGS. 3B, 3C, and 3D are inset view of the sheaves, hydraulic cylinders, and cables according to one embodiment of the invention.
Figure 3B:
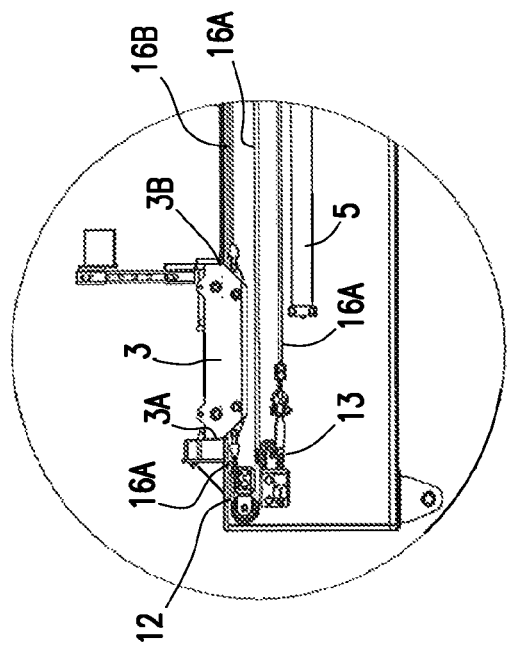
Figure 3A:
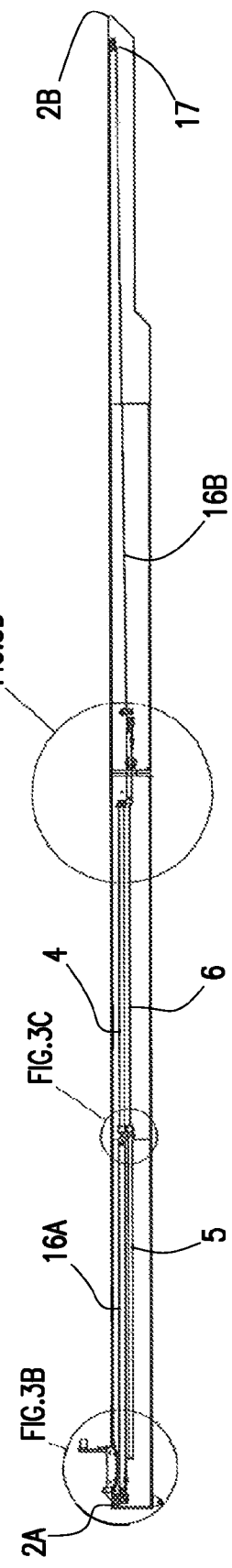
FIG. 3A is a cross section of the trough that shows the two hydraulic cylinders, the sheave connected to the ends of the rods for each of the cylinders, the sheaves attached to the inner walls of the catwalk, the skate, and the cable used with the cylinders to move the skate.
Figure 3D:
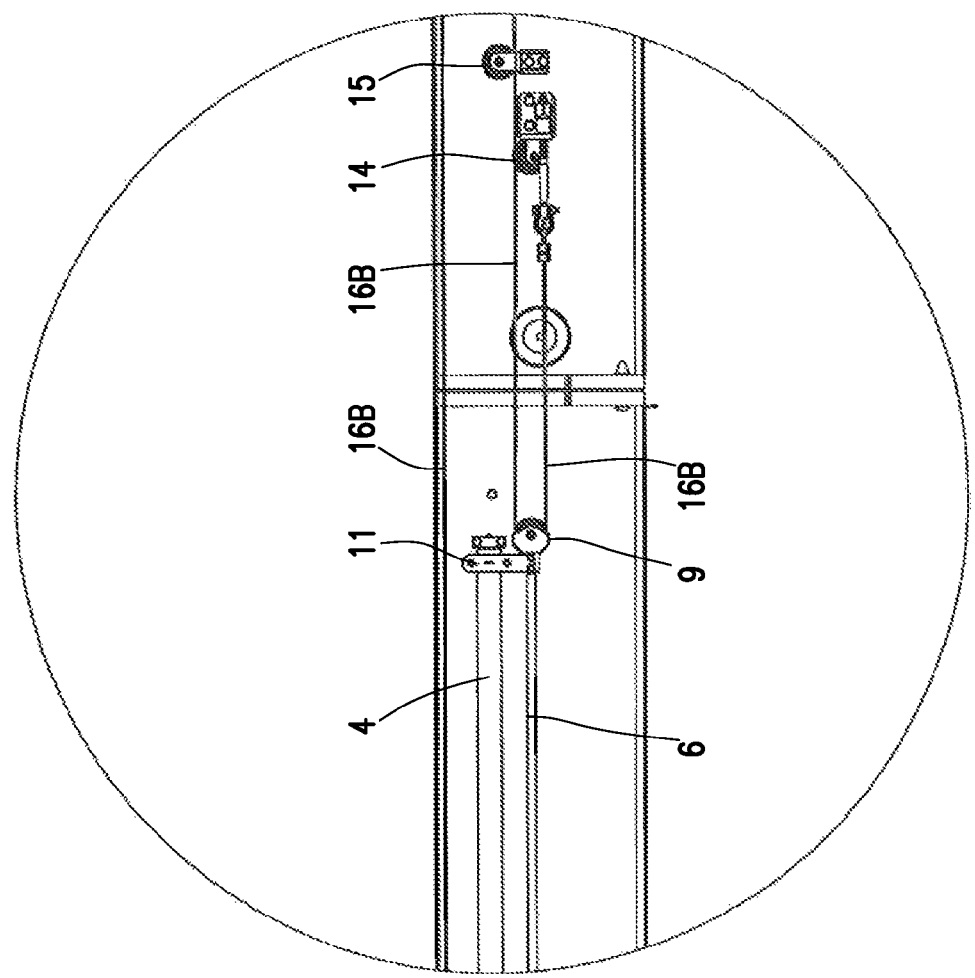
Figure 5B:
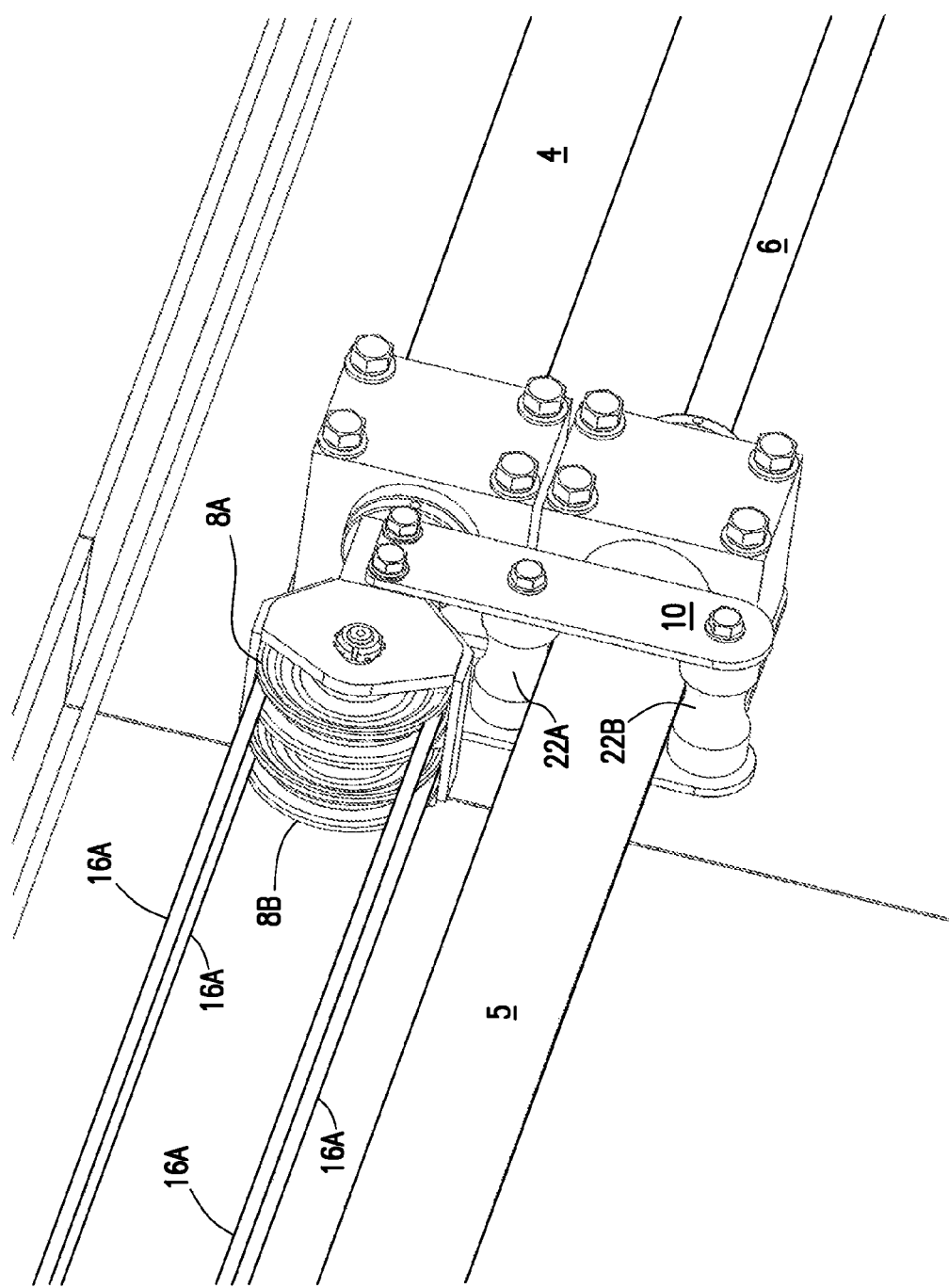
FIG. 5B is another view of the components shown in FIG. 3C, which shows the rollers on each side of the lower hydraulic cylinder which support the rod for the upper hydraulic cylinder rod as it is advanced and retracted.

FIG. 3A is a cut away view of trough 2 showing a drive system according to one embodiment of the invention. The drive system comprises hydraulic cylinder 4, shown in FIGS. 3C and 5 with its rod 7 retracted inside the cylinder 4, and hydraulic cylinder 5, shown with its rod 6 extended. As shown in FIG. 3C, rod 7 of cylinder 4 is connected to bracket 10 and sheave set 8. Sheave set 9 and bracket 11 are connected to rod 6, as shown in FIG. 3D. Bracket 10 is positioned around cylinder 5. Rollers 22A and 22B (shown in FIG. 5B) on the inside of bracket 10 roll on opposite side of cylinder 5 as sheave set 8 and bracket 10 move down the length of cylinder 5 when rod 7 is extended from cylinder 4 or retracted into cylinder 4. Bracket 11 has rollers 22C and 22D (shown in FIG. 6) that are positioned around and roll on opposite sides of cylinder 4 as rod 6 is retracted into or extended from cylinder 5.

Sheaves 12, 13, 14, 15, and 17 (as shown in FIGS. 3A, 3B, and 3D) are fixed to the interior of trough 2 via brackets.

Figure 4:
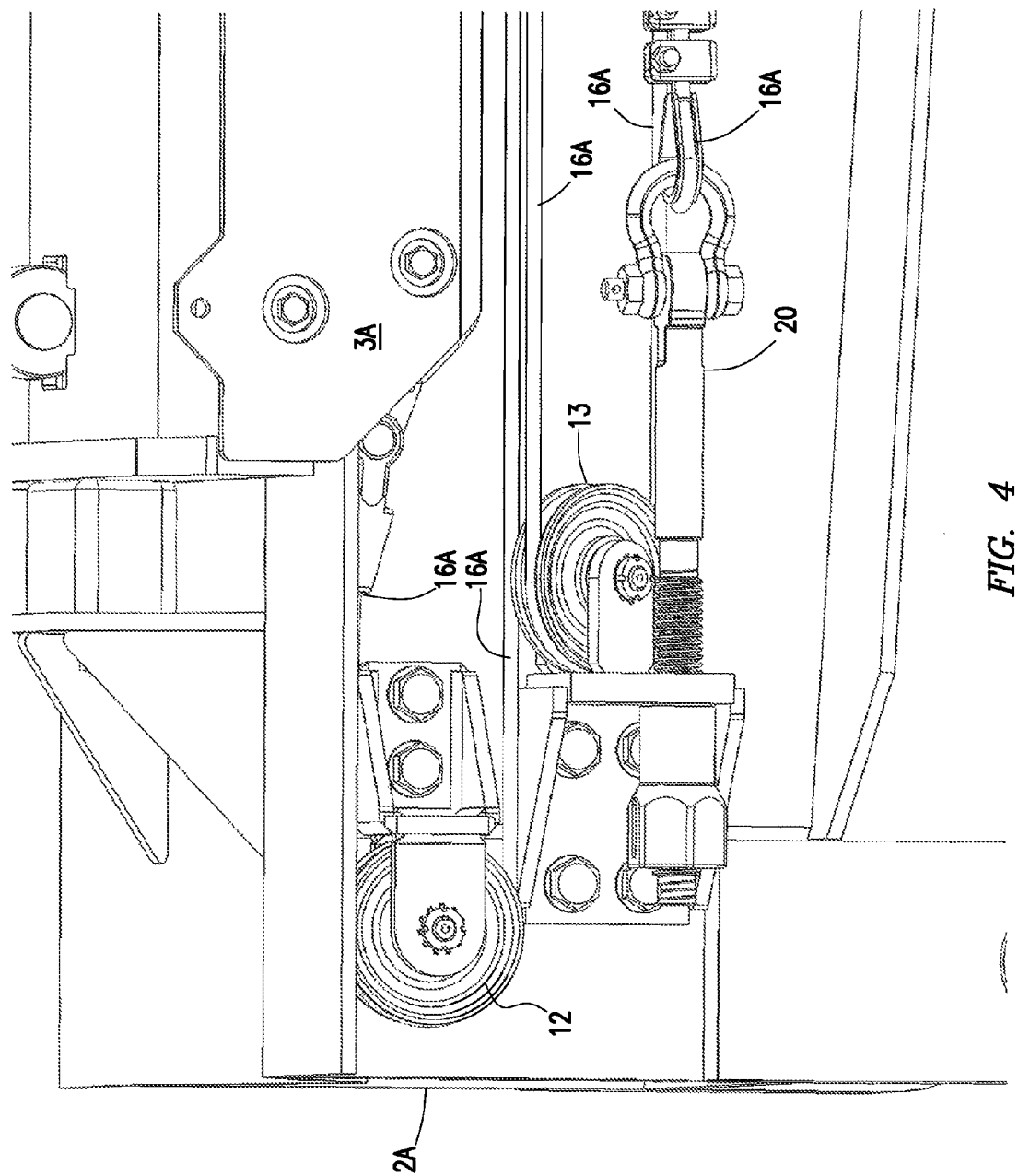
FIG. 4 is a detailed view of the sheaves, brackets, cable and skate shown in FIG. 3B.

As illustrated in FIG. 3B, cables 16A and 16B are attached to ends 3A and 3B, respectively, of skate 3. As shown in further detail in FIG. 4, from end 3A, cable 16A loops around sheave 12. From there, cable 16A wraps around sheave 8B, as shown in FIG. 5A, and then around sheave 13 as shown in FIG. 4. From there, cable 16A wraps around sheave 8A, as shown in FIG. 5A, and then connects to connector 20 as shown in FIG. 4.

Figure 6:
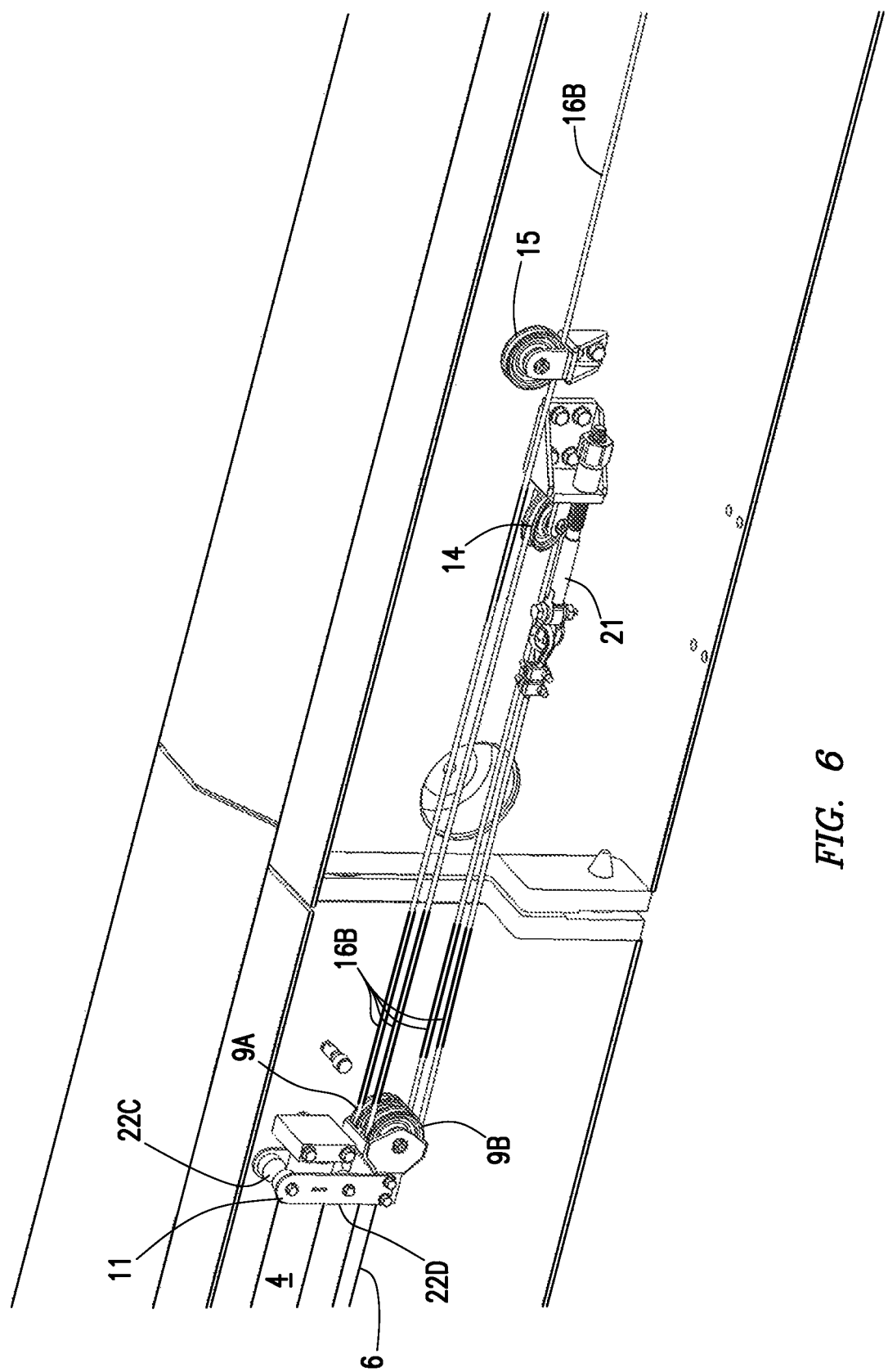
FIG. 6 is a detailed view of the upper hydraulic cylinder, the lower hydraulic cylinder rod, the sheaves, brackets, and cable shown in FIG. 3D.

From end 3B of skate 3, cable 16B travels and goes around sheave 17 at end 2B of the trough 2, as shown in detail in FIG. 7. From sheave 17, cable 16B goes under sheave 15, as shown in FIG. 3D and FIG. 6, around sheave 9A, around sheave 14, around sheave 9B and then to connector 21, which is affixed to the same bracket as sheave 14.

To advance the pipe to the drill floor, skate 3 is moved from end 2A of the trough 2 toward end 2B by advancing hydraulic cylinder 4 and retracting hydraulic cylinder 5. Hydraulic fluid is used to retract rod 6 into cylinder 5, causing sheave set 9 to move toward cylinder 5. At the same time, rod 7 is extended from cylinder 4 and sheave set 8 moves away from cylinder 4. Because multiple lengths of cable are wrapped around sheath set 8 and sheath set 9, for each foot that the hydraulic cylinders rods 6, 7 advance or retract, the skate 3 moves about four feet. Sequence valves in the hydraulic system maintain and hold tension on cables 16A and 16B while skate 3 is advanced.

When rod 7 is fully extended from cylinder 5 and rod 6 is fully retracted into cylinder 5, skate 3 will stop moving and workers at the drill floor will remove the pipe from the skate 3. Skate 3 is returned to end 2A of trough 2 by retracting rod 7 into cylinder 4 and extending rod 6 from cylinder 5.

Figure 8A:
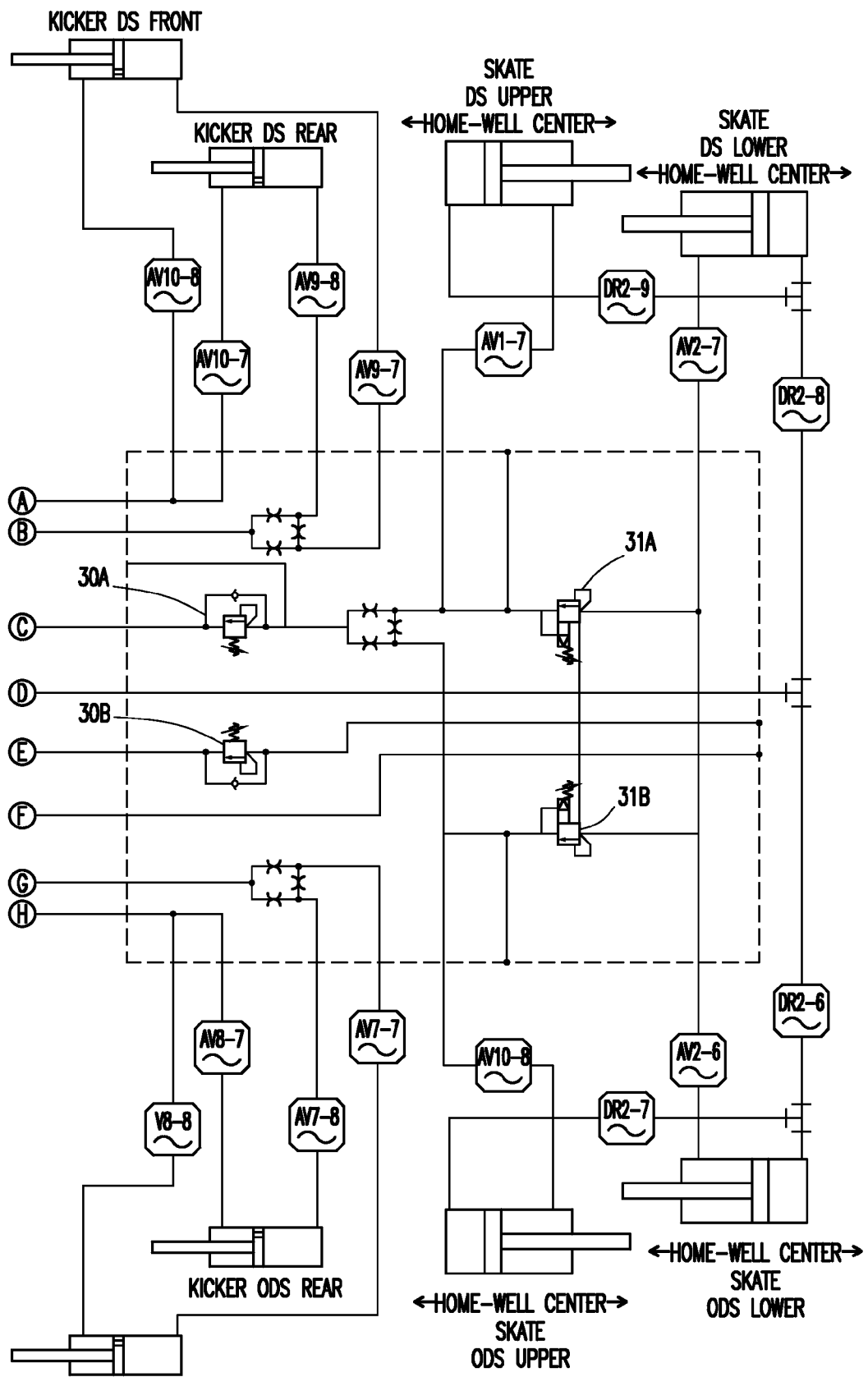
FIGS. 8A and 8B illustrate a schematic diagram of the valve system for the hydraulic system.
Figure 8B:
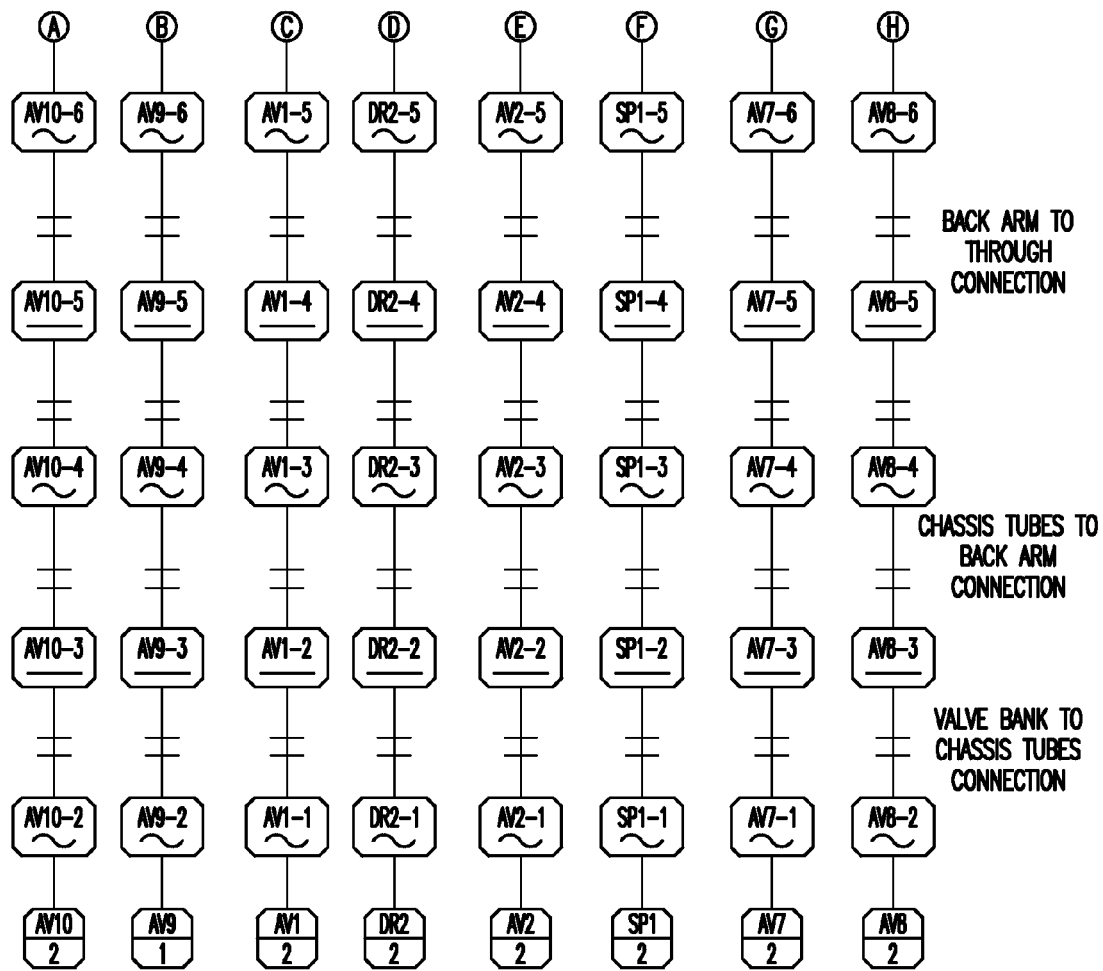

FIGS. 8A and 8B show a schematic for the hydraulic system for hydraulic cylinders 4 and 5. Sequence valves 30A and 30B hold tension between the cable drive system. The sequence valves 30A, 30B retain positive pressure on whichever of hydraulic cylinder 4 and hydraulic cylinder 5 are in the process of advancing. In the event that a pipe is dropped from the drill floor down the trough 2 and onto the skate 3, relief valves 31A and 31B allow oil to be routed from the rod end of hydraulic cylinder 5 to the rod end of hydraulic cylinder 6 so that the skate 3 and the hydraulic cylinders 4, 5 absorb the impact of the pipe and the system is not damaged.

While the foregoing is directed to embodiments of the invention, other and further embodiments of the invention may be devised without departing from the basic scope thereof, and the scope thereof is determined by the claims that follow.

The invention claimed is:

1. A skate drive system for a catwalk, comprising:
    a skate member configured to move a pipe along a trough of the catwalk;
    a first hydraulic cylinder having a first rod member coupled to the skate member by a first cable;
    a second hydraulic cylinder having a second rod member coupled to the skate by a second cable, wherein the first and second hydraulic cylinders are configured to extend and retract the first and second rod members to move the skate member via the first and second cables along the trough of the catwalk;
    a first sheave coupled to the first rod member, wherein the first cable wraps around the first sheave; and
    a bracket coupled to the first sheave and having rollers that are in contact with opposite sides of the second hydraulic cylinder, wherein the rollers move along a length of the second hydraulic cylinder when the first rod member is extended from or retracted into the first hydraulic cylinder.

2. The system of claim 1, wherein the first cable is coupled to one end of the skate member, and wherein the second cable is coupled to an opposite end of the skate member.

3. The system of claim 1, wherein the first sheave and the bracket move along the length of the second hydraulic cylinder when the first rod member extends from or retracts into the first hydraulic cylinder.

4. The system of claim 3, wherein the second cable wraps around a second sheave that is coupled to the second rod member.

5. The system of claim 4, wherein the second sheave is coupled to a second bracket having rollers that are disposed on opposite sides of the first hydraulic cylinder.

6. The system of claim 5, wherein the second sheave, the second bracket, and the rollers move along a length of the first hydraulic cylinder when the second rod member extends from or retracts into the second hydraulic cylinder.

7. The system of claim 1, wherein the first rod member is extended from the first hydraulic cylinder as the second rod member is retracted into the second hydraulic cylinder to move the skate member.

8. The system of claim 1, wherein the first and second cables are in tension while the skate member moves along the trough.

9. A method of operating a skate drive system for a catwalk, comprising:
    retracting a first rod member into a first hydraulic cylinder to move a skate member along a trough of the catwalk, wherein the first rod member is coupled to one end of the skate member by a first cable that wraps around a first sheave that is coupled to the first rod member, and wherein the first sheave is coupled to a bracket having rollers that are in contact with opposite sides of a second hydraulic cylinder;
    extending a second rod member from the second hydraulic cylinder to move the skate member along the trough of the catwalk, wherein the second rod member is coupled to an opposite end of the skate member by a second cable;

moving the rollers of the bracket along a length of the second hydraulic cylinder when retracting the first rod member into the first hydraulic cylinder; and maintaining the first and second cables in tension as the skate member moves along the trough of the catwalk.

10. The method of claim 9, further comprising moving the first sheave and the bracket along the length of the second hydraulic cylinder when the first rod member extends from or retracts into the first hydraulic cylinder.

11. The method of claim 10, wherein the second cable wraps around a second sheave that is coupled to the second rod member.

12. The method of claim 11, wherein the second sheave is coupled to a second bracket having rollers that are disposed on opposite sides of the first hydraulic cylinder.

13. The method of claim 12, further comprising moving the second sheave, the second bracket, and the rollers along a length of the first hydraulic cylinder when the second rod member extends from or retracts into the second hydraulic cylinder.

14. The method of claim 9, wherein the first rod member is retracted into the first hydraulic cylinder while the second rod member is extended from the second hydraulic cylinder to move the skate member along the trough.

15. A skate drive system for a catwalk, comprising:

a first hydraulic cylinder and a second hydraulic cylinder coupled to opposite ends of a skate configured to move a pipe along a trough of the catwalk, wherein the first hydraulic cylinder has a first rod member coupled to the skate member, wherein the second hydraulic cylinder has a second rod member coupled to the skate, and wherein the first hydraulic cylinder and the second hydraulic cylinder are configured to extend and retract the first rod member and the second rod member, respectively, to move the skate member along the trough of the catwalk; and a bracket coupled to the second rod member and having rollers that are in contact with opposite sides of the first hydraulic cylinder, wherein the rollers move along a length of the first hydraulic cylinder when the second rod member is extended from or retracted into the second hydraulic cylinder.

16. The system of claim 15, wherein the first rod member is coupled to the skate by a first cable, and wherein the second rod member is coupled to the skate by a second cable.

17. The system of claim 16, further comprising a first sheave coupled to the bracket, wherein the first cable wraps around the first sheave.

* * * * *